United States Patent
Grau (10) Patent No.: US 10,429,540 B2
(45) Date of Patent: Oct. 1, 2019

(54) COMBINING INELASTIC AND CAPTURE GAMMA RAY SPECTROSCOPY FOR DETERMINING FORMATION ELEMENTAL

(71) Applicant: SCHLUMBERGER TECHNOLOGY CORPORATION, Sugar Land, TX (US)

(72) Inventor: James A. Grau, Marshfield, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 437 days.

(21) Appl. No.: 13/656,287

(22) Filed: Oct. 19, 2012

(65) Prior Publication Data
US 2013/0158876 A1    Jun. 20, 2013

Related U.S. Application Data

(60) Provisional application No. 61/576,082, filed on Dec. 15, 2011.

(51) Int. Cl.
G01V 5/10         (2006.01)
(52) U.S. Cl.
CPC .................................. G01V 5/101 (2013.01)
(58) Field of Classification Search
USPC .......................................................... 702/8
See application file for complete search history.

(56) References Cited

U.S. PATENT DOCUMENTS

| 3,780,301 A | 12/1973 | Smith, Jr. et al. |
| 4,430,567 A | 2/1984 | Oliver |
| 4,661,701 A | 4/1987 | Grau |

(Continued)

FOREIGN PATENT DOCUMENTS

| EA | 12156 B1 | 8/2009 |
| RU | 2354998 C2 | 1/2006 |
| RU | 2431872 C2 | 10/2011 |

OTHER PUBLICATIONS

Neutron-capture gamma-ray analysis of coal for sulfur, iron, silicon and moisture by David Allyn Fay in 1979, 135 pages.*

(Continued)

Primary Examiner — Tung S Lau
(74) Attorney, Agent, or Firm — Michael Dae (57) ABSTRACT

A method for determining weight fractions of a plurality of elements in a subsurface formation penetrated by a wellbore includes determining weight fractions of a first plurality of elements using measurements of capture gamma rays made in the wellbore. The capture gamma rays result from bombardment of the formations with high energy neutrons. A weight fraction of a second plurality of elements is determined using measurements of inelastic gamma rays made in the wellbore resulting from bombardment of the formations with high energy neutrons. The weight fraction for the second plurality is determined by setting a transformation factor for those elements common to both the first and second plurality to result in a statistically equivalent weight fraction for the common elements as determined for the first plurality of elements. Weight fractions of elements in the second plurality not common to the first plurality of elements is determined using the set transformation factor.

22 Claims, 4 Drawing Sheets

(56) References Cited

U.S. PATENT DOCUMENTS

| | | | |
|---|---|---|---|
| 4,697,650 A | | 10/1987 | Fontenot |
| 4,810,876 A | * | 3/1989 | Wraight et al. ............... 250/256 |
| 5,097,123 A | | 3/1992 | Grau et al. |
| 5,434,408 A | | 7/1995 | Smith, Jr. et al. |
| 5,440,118 A | * | 8/1995 | Roscoe ................. G01V 5/101 |
| | | | 250/262 |
| 5,973,321 A | * | 10/1999 | Schmidt ..................... 250/269.6 |
| 6,376,838 B1 | | 4/2002 | Odom |
| 7,073,378 B2 | | 7/2006 | Smits et al. |
| 7,366,615 B2 | | 4/2008 | Herron et al. |
| 9,091,774 B2 | | 7/2015 | Miles et al. |
| 2002/0130258 A1 | | 9/2002 | Odom et al. |
| 2003/0176973 A1 | | 9/2003 | Hashem et al. |
| 2005/0067563 A1 | * | 3/2005 | Gilchrist et al. ............ 250/269.7 |
| 2006/0033022 A1 | | 2/2006 | Madigan et al. |
| 2007/0145259 A1 | | 6/2007 | Gilchrist et al. |
| 2008/0023629 A1 | | 1/2008 | Herron et al. |
| 2010/0025574 A1 | | 2/2010 | Georgi et al. |
| 2010/0105975 A1 | * | 4/2010 | Baird ................. E21B 41/0057 |
| | | | 588/16 |
| 2013/0014943 A1 | | 1/2013 | Harrison et al. |
| 2016/0047938 A1 | | 2/2016 | Grau et al. |

OTHER PUBLICATIONS

Grau et al., 1989, A Geological Model for Gamma-ray Spectroscopy Logging Measurements, Nucl. Geophysics, vol. 3, No. 4, Int. J. Radiat. Appl. Instrum. Part E, pp. 351-359.

International Search Report and Written Opinion for International Application No. PCT/US2012/069345 dated Mar. 28, 2013.

Search Report issued in EP application 12858030.5 dated Aug. 3, 2015, 3 pages.

Office Action issued in EP application 12858030.5 dated Sep. 3, 2015, 6 pages.

International Preliminary Report on Patentability issued in the related PCT application PCT/US2012/069345 dated Jun. 17, 2014 (4 pages).

Office action issued in the related EP Application 12858030.5, dated Jan. 18, 2018 (8 pages).

Gomaa et.al, Case History of Automated Evaluation of Mineralogy and Porosity in Complex Carbonates, Well Log Analysis (SPWLA) 47th Annual Logging Symposium, Jun. 4-7, 2006 Paper JJ (10 pages).

Han et al, Environmental Corrections and System Calibration for a New Pulsed-Neutron Mineralogy Instrument, SPWLA 50th Annual Loggin Symposium, Jun. 21-24, 2009 (16 pages).

International Search Report issued and written opinion issued in the related PCT application PCT/US2013/063417, dated Feb. 4, 2014 (6 pages).

International preliminary report on patentability issued in the related PCT application PCT/US2013/063417, dated Apr. 7, 2015 (10 pages).

\* cited by examiner

COMBINING INELASTIC AND CAPTURE GAMMA RAY SPECTROSCOPY FOR DETERMINING FORMATION ELEMENTAL

CROSS-REFERENCE TO RELATED APPLICATIONS

Priority is claimed from U.S. Provisional Application No. 61/576,082 filed on Dec. 15, 2011, which application is incorporated herein by reference in its entirety.

STATEMENT REGARDING FEDERALLY SPONSORED RESEARCH OR DEVELOPMENT

Not applicable.

BACKGROUND

This disclosure relates generally to the field of neutron activation spectroscopy of subsurface formations. More specifically, the disclosure relates to methods for determining elemental weight fractions of subsurface formations using both capture gamma rays and inelastic gamma rays resulting from neutron activation of the subsurface formations.

Nuclear spectroscopy performed within wellbores drilled through subsurface formations may provide estimates of the chemical composition of one or more of the formations. For chemical composition analysis, nuclear spectroscopy is generally divided into two classes nuclear spectroscopy of inelastic neutron collision measurements, and nuclear spectroscopy of thermal neutron capture measurements. In particular, when a formation is bombarded with high energy neutrons (e.g., 14 MeV), from a neutron source deployed in the wellbore, some of the neutrons inelastically scatter upon collision with the nuclei of certain atoms in the formations and as a result generate gamma rays having characteristic energy spectra related to the particular atoms with which the neutrons collide.

A wellbore spectroscopy tool may include a so called pulsed neutron generator (PNG) as a source. A PNG emits controlled duration "bursts" of high energy neutrons. Gamma rays may be detected in selected time intervals ("windows") referenced to the time during which the neutrons are being generated. Detection while the neutrons are being generated may be used to measure the spectrum of gamma ray energies, particularly inelastic in such case. The gamma ray energy spectrum can then be analyzed using a set of pre-defined elemental standard spectra to determine the relative contribution of each element to the measured spectrum. Elements typically included in an inelastic spectrum include carbon (C), oxygen (O), silicon (Si), calcium (Ca), iron (Fe) and sulfur (S) among others. The most common application for inelastic spectroscopy data is to use a carbon to oxygen ratio to estimate formation water saturation (fractional volume of formation pore space that is water filled), although the results of inelastic gamma ray measurements have also been used in determining formation mineral composition (lithology). See, e.g., U.S. Pat. No. 5,440,118 to Roscoe which is hereby incorporated by reference herein in its entirety.

Similarly, when neutrons from any source, such as a PNG, a radioisotope source or other source, bombard a formation, the neutrons eventually lose energy until they reach thermal level (i.e., where their motion is substantially related to ambient temperature). At thermal energies neutrons may be captured by the nuclei of certain formation elements, upon which the capturing nuclei emit gamma rays having energies that are characteristic of the specific element. Again, a wellbore spectroscopy tool may be used to detect the capture gamma rays. Such detection ordinarily takes place in a later time window when a PNG is used, and the gamma ray spectrum may be analyzed to determine the relative contributions of each of the contributing elements to the measured gamma ray spectrum. Elements in a capture gamma ray spectrum may include, for example and without limitation, silicon (Si), calcium (Ca), iron (Fe), sulfur (S), titanium (Ti), gadolinium (Gd), hydrogen (H), chlorine (Cl), aluminum (Al), sodium (Na), magnesium (Mg), manganese (Mn), nickel (Ni) and phosphorus (P) among others. The contributions of the various elements to the gamma ray spectrum may then be used to estimate elemental concentrations through a geological model, sometimes referred to as "oxides closure". See. Gum et al., 1989, *A Geological Model for Gamma-ray Spectroscopy Logging Measurements*, Nucl. Geophysics, Vol. 3, No. 4, pp. 351-359 and U.S. Pat. No. 4,810,876 issued to Wraight et al, which is hereby incorporated by reference herein in its entirety.

U.S. Pat. No. 7,366,615 issued to Herron et al. describes a method for calibrating the elemental spectral yields from inelastic reactions using a single element common to both capture and inelastic reactions. The method disclosed in Herron et al. '615 works best where sufficient silicon is present. Also, the method disclosed in Herron et al. '615 does not include combining the concentration estimates to produce enhanced concentration estimates for all of the elements measured using both capture and inelastic gamma ray spectroscopy.

There exists a need for improved techniques for determining elemental concentrations from neutron activation measurements.

SUMMARY

One aspect is a method for determining weight fractions of each of a plurality of elements in a subsurface formation penetrated by a wellbore. A method according to this aspect includes determining weight fractions of a first plurality of elements using measurements of capture gamma rays made in the wellbore. The capture gamma rays result from bombardment of the formations with high energy neutrons. A weight fraction of a second plurality of elements is determined using measurements of inelastic gamma rays made in the wellbore resulting from bombardment of the formations with high energy neutrons. The weight fraction for the second plurality is determined by setting a transformation factor for those elements common to both the first and second plurality to result in statistically equivalent weight fractions for the common elements as determined for the first plurality of elements. Weight fractions of elements in the second plurality of elements not common to the first plurality of elements are determined using the set transformation factor.

Other aspects and advantages will be apparent from the description and claims which follow.

DETAILED DESCRIPTION

Figure 1A:
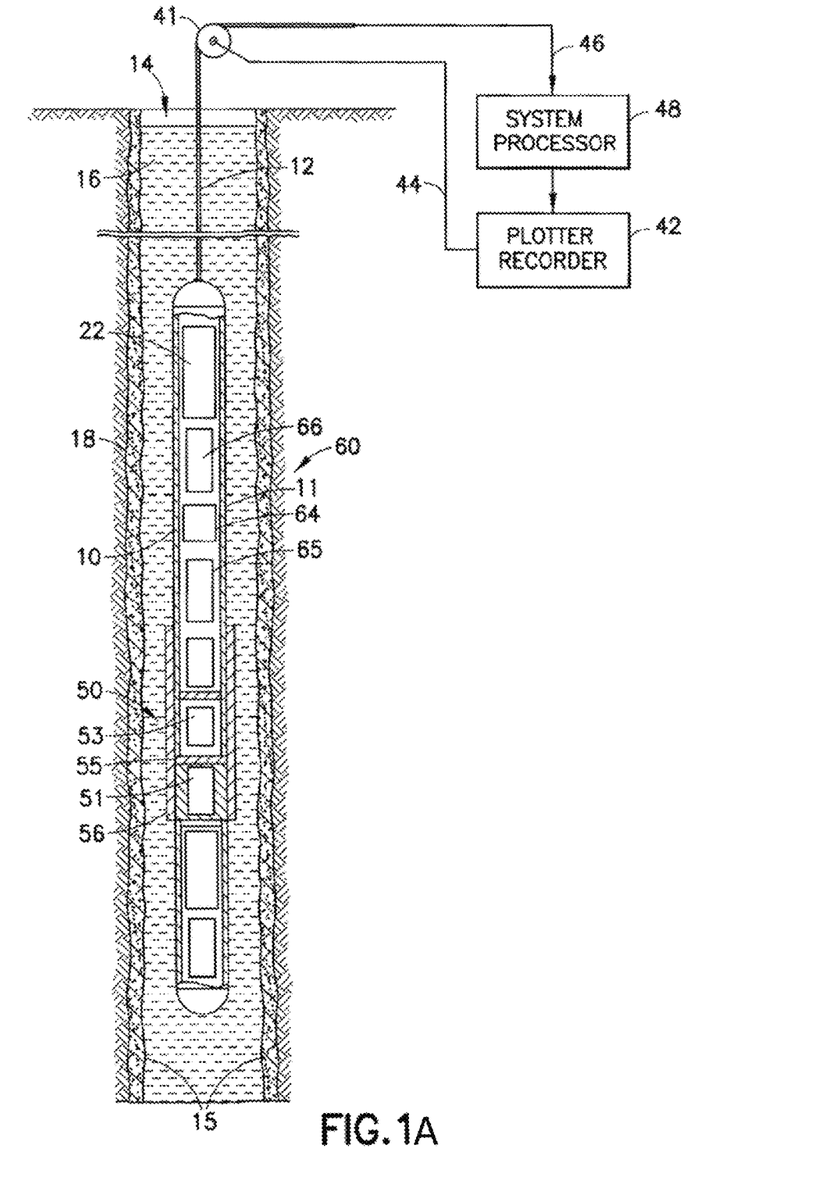
FIG. 1A is a schematic diagram of a wireline conveyed tool in a wellbore which may be used to make measurements for use with an example method.

FIG. 1A shows an example well logging instrument that can be used to obtain measurements usable with a method according to the present disclosure. The example well logging instrument 10 may be suspended by an armored cable 12 in a wellbore 14 and moved within the wellbore by extending and retracting the cable 12. The wellbore 14 is typically filled with fluid 16 such as brine or drilling "mud" and is surrounded by earthen formations 18 through which the wellbore 14 is drilled. During drilling of the wellbore 14, the fluid 16, if drilling mud is used, typically deposits a layer of material on the wellbore wall in the form of a mud cake 15.

The well logging instrument 10 may include an elongated housing 11 including a communication cartridge 22 and a plurality of tool systems designed to acquire data for the determination of the absolute or relative concentrations of a plurality of chemical elements in the formations 18.

It should be understood that reference herein to tools, well logging instruments, detectors, tool systems, and the like are not to be construed as defining limitations on whether a particular function is to be performed by a single device or a plurality of devices, or whether such devices are contained within a single tool, or a plurality of tools drawn through the wellbore 14 in tandem. For convenience, the term "well logging instrument" as used herein, shall refer to one or more individual devices that acquire and process measurements made of the formation and/or the wellbore 14 (whether open hole, cased hole or otherwise), regardless of the manner of conveyance therethrough, for use in determining a specific property or quantity of interest.

While the well logging instrument 10 is moved through the wellbore 14, an indication of its depth in the wellbore 14 may be provided by a depth determining apparatus, such as one generally indicated at 41, which is responsive to movement of the cable 12 as it is extended and reeled in by a winch (not shown). The depth determining apparatus 41 may be connected to a plotter/recorder 42 by a conventional, well-known cable-following device 44. Again, it should be noted that the well logging instrument 10 used with a method according to the invention need not be a "wireline" instrument, i.e., conveyed by a cable 12 as shown in FIG. 1A, and may include logging or measurement while drilling (LWD or MWD) instruments or tools deployed in a wellbore by other methods known in the art. The latter will be described with reference to FIG. 1B.

The measurements made by the different tool systems in the well logging instrument 10 may be initially processed in the communication cartridge 22 and may be transmitted through the cable 12, by means of a communication line 46 into the system processor 48, although mud pressure or flow modulation telemetry is typically used in LWD and MWD tools (FIG. 1B), and other communication systems can be used. Alternatively, measurement data may be stored in the well logging instrument 10 and provided to the system processor 48 when the well logging instrument 10 is withdrawn from the wellbore 14. The system processor 48 is typically located above ground, although processing may occur in the well logging instrument 10 if so configured. One function of the system processor 48 is to determine the elemental concentrations in the formations 18 and store values of the foregoing. The system processor 48 may be implemented using one or more of a computer, dedicated hardware, data storage elements, software, or other well-known elements. A plot or recording of the elemental concentrations at various depths within the wellbore 14 can be made, as shown at 42.

The well logging instrument 10 includes a plurality of tool systems preferably successively arranged along the well logging instrument 10. While many different tool systems may be used, the well logging instrument 10 typically includes at least a tool system capable of measuring both the inelastic and the capture gamma ray spectra of the earth formations 18 adjacent the wellbore 14, when the formations are bombarded by high energy neutrons. Such tool systems may take the form of a single source-detector arrangement on a single tool, or one or more sources and one or more detectors on one or more tools. As shown in FIG. 1A, the well logging instrument 10 depicted is provided with an inelastic spectrum measurement system 50 such as disclosed in U.S. Pat. No. 5,440,118 to Roscoe which is hereby incorporated by reference herein in its entirety. The inelastic spectrum measurement system is shown below the communication cartridge 22. The inelastic spectrum measurement system 50 typically includes a pulsed neutron generator 51 and at least one gamma ray detector 53, with high-density shielding 55 interposed therebetween. The pulsed neutron generator 51 is preferably capable of generating, relatively high energy neutrons (e.g., 14 MeV). The inelastic spectrum measurement system 50 may be surrounded by a boron carbide impregnated sleeve 56 in the region of the pulsed neutron generator 51 and the gamma ray detector 53 to minimize the detection of capture gamma rays originating from neutron interactions in the well logging instrument 10 and the wellbore fluid 16 (drilling mud).

The well logging instrument 10 may also be provided with a capture spectrum measurement system 60 which is shown disposed between the inelastic spectrum measurement system 50 and the communication cartridge 22. The capture spectrum measurement system 60 typically includes a broad energy spectrum neutron source 64 disposed between first and second gamma ray detectors 65, 66 such as disclosed in U.S. Pat. No. 5,097,123 to Grau et al., which is hereby incorporated by reference herein in its entirety. The broad energy spectrum neutron source may be an americium-beryllium (AmBe) source which emits neutrons in an energy range of about 2 to 10 MeV, although other radioisotope sources can be used. The capture spectrum measurement system 60 may be embodied in instruments known by the trademarks ECS, EcoScope and RST, each of the foregoing, being trademarks of Schlumberger Technology Corporation, Sugar Land, Tex., although other capture spectrum analysis tools may be used. Capture gamma rays may also be detected using, the inelastic spectrum measurement system 50 by detecting, gamma rays that occur later in time (and at suitable expected energy levels) from initiation of neutron bursts when a pulsed neutron generator (e.g., 51) is used.

As is known in the art, the detectors in each of the inelastic gamma ray spectral analysis system 50 and the capture gamma ray spectral analysis system 60 may include various compositions of scintillation detectors (not shown separately) optically coupled to a photomultiplier (not shown separately). The scintillation detectors may be made from any substance known in the art for such purpose, including, without limitation, thallium doped sodium iodide, bismuth germanate, and gadolinium oxyorthosilicate in crystalline form, or other material in plastic form. The scintillation detectors produce light pulses corresponding in amplitude to the energy of the gamma rays detected by the crystal. Signal output from the respective photomultiplier may be coupled to a pulse amplitude analyzer (not shown separately). The energy of gamma rays detected by each crystal may thus be quantified; numbers of gamma rays detected by each crystal thus may be quantified and analyzed with respect to energy level, thus enabling the described spectral analysis.

Other tool systems may be provided in addition to the inelastic spectrum measurement system 50 and the capture spectrum measurement system 60 as desired. These additional tool systems may include measurement systems such as an "NGS" tool or "HNGS" tool, each of which measures natural gamma radiation emitted by a plurality of elements in the formations 18 such as potassium, uranium, and thorium; an aluminum activation tool such as the "AACT" tool which measures aluminum concentration in the formations, etc. NGS, HNGS, and AACT are also trademarks of Schlumberger Technology Corporation.

Using the gamma ray detector of the inelastic spectrum measurement system 50, the system processor 48 can determine the contribution of various elements such as C, O, Si, Ca, Fe, Mg, and S to the measured spectrum. Similarly, using the gamma ray detector(s) of the capture spectrum measurement system 60, the systems processor 48 can determine the contribution of elements such as Si, Ca, Fe, S, Ti, Gd, H, Cl, and others (e.g., without limitation, Al, Na, Mg, Mn, Ni, P, Cu, Ba).

Figure 1B:
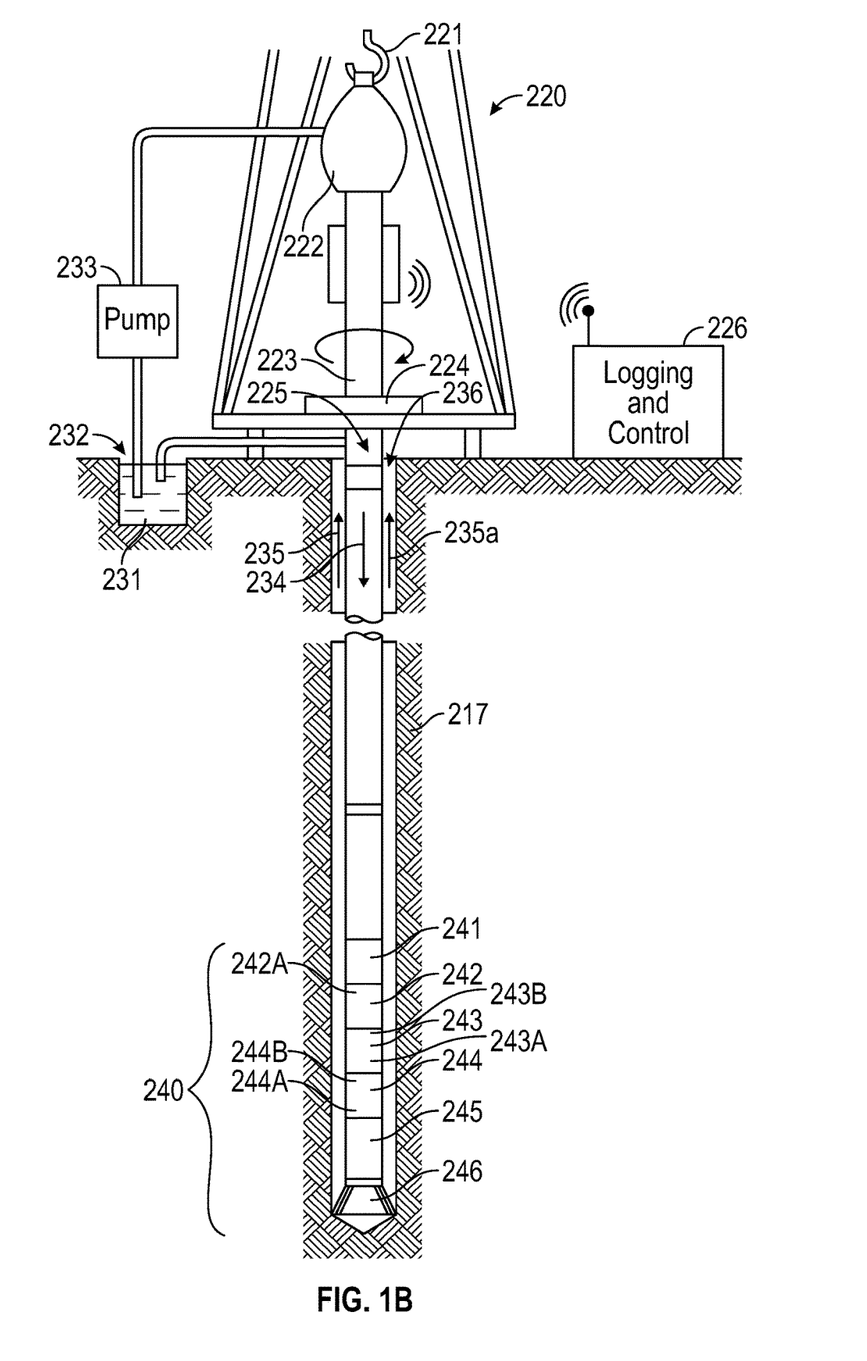
FIG. 1B shows an example of a measurement while drilling tool that may also make measurements usable with an example method.

An example instrument system that may be used while drilling or other operation conducted using drill pipe is shown in FIG. 1B. Methods or means of conveyance of the instruments may include any methods or means of conveyance known to those of ordinary skill in the art. FIG. 1B, for example, illustrates a wellsite system in which data to be used according to examples of the present disclosure may be used by conveyance of the instruments as part of a "drill string." The wellsite can be onshore or offshore. In this example system, a wellbore may be formed in subsurface formations by rotary drilling in a manner that is well known.

The drill string 225 is suspended within a borehole 236 and may have a bottom hole assembly (BHA) 240 which includes a drill bit 246 at its lower end. A surface drilling system 220 includes platform and derrick assembly positioned over the borehole 236, the assembly including a rotary table 224, kelly (not shown), hook 221, and rotary swivel 222. The drill string 225 is rotated by the rotary table 224 (energized by means not shown), which engages the kelly (not shown) at the upper end of the drill string 225. The drill string 225 is suspended from the hook 221, attached to a traveling block (also not shown), through the kelly (not shown) and the rotary swivel 222 which permits rotation of the drill string 225 relative to the hook 221. As is well known, a top drive system could be used instead of the system shown in FIG. 1B.

In the illustrated example, the surface system further includes drilling fluid or mud 232 stored in a pit 231 formed at the well site. A pump 233 delivers the drilling fluid to the interior of the drill string 225 via a port (not shown) in the swivel 222, causing the drilling fluid 232 to flow downwardly through the drill string 225 as indicated by the directional arrow 234. The drilling fluid 232 exits the drill string 225 via ports (not shown) in the drill bit 246, and then circulates upwardly through an annular space 235 between the outside of the drill string 225 and the wall of the wellbore 236, as indicated by the directional arrows 235 and 235A. In this well known manner, the drilling fluid 232 cools and lubricates the drill bit 246, and carries formation cuttings up to the surface as it is returned to the pit 231 for recirculation.

The BHA 240 of the illustrated embodiment may include various measuring instruments, including a measuring-while-drilling (MWD) tool 241, and various logging-while-drilling (LWD) tools 242, 243, 244, a rotary steerable directional drilling system 245 and mud 232 operated motor, and the drill hit 250. The LWD tools 242, 243, 244 may be housed in a special type of drill collar, as is known in the art, and can contain one or a plurality of known types of logging tools. The LWD tools 242, 243, 244 may include capabilities for measuring, processing, and storing information, as well as for communicating with the surface equipment. In the present example, one of the LWD tools 242 may include at least one scintillation type radiation detectors 242B with a multichannel analyzer adapted to fit in the special drill collar for performing natural gamma ray emission spectroscopic analysis. An example scintillation type radiation detector with a multichannel analyzer is described in U.S. Pat. No. 7,073,378 issued to Smits et al. and incorporated herein by reference. Such detectors may include a scintillation material (which may be in crystalline form) optically coupled to a photomultiplier tube. The scintillation material may be materials, for example and without limitation, such as thallium-doped sodium iodide, bismuth germanate and gadolinium oxyorthosilicate as explained above.

The other LWD tools 243, 244 may also each include at least one scintillation type radiation detector, 243B, 244B, respectively, as well as respective radiation sources 243A, 244A to impart radiation such as neutrons and gamma rays to the formations adjacent the wellbore 226. The sources 243A, 244A may be radioisotopic or electrically powered sources. The respective radiation detectors 243B, 244B may characterize the spectrum of gamma rays returning from the formations by energy level as a result of interaction of the source emitted radiation in order to evaluate mineral composition and fluid content of the formations.

The MWD tool 241 may also be housed in a special type of drill collar, as is known in the art, and can contain one or more devices for measuring characteristics of the drill string and drill bit. The MWD tool 241 may further include an apparatus (not shown separately, for generating electrical power to the downhole system. This may typically include a mud turbine generator powered by the flow of the drilling fluid, it being understood that other power and/or battery systems may be employed. In the present embodiment, the MWD tool 241 may include one or more of the following types of measuring devices: a weight-on-bit measuring, device, a torque measuring device, a vibration measuring device, a shock measuring device, a stick slip measuring device, a direction measuring device, and an inclination measuring device. The power generating apparatus (not shown) may also include a drilling fluid flow modulator for communicating measurement and/or tool condition signals to the surface for detection and interpretation by a logging and control unit 226.

Having described various example instruments that may make measurements usable in accordance with the present disclosure, an example method for obtaining concentrations and or weight fractions of various elements using such measurements will now be explained with reference to FIG. 2. Transforming detected gamma-ray yields (Yj) for a rock element j into elemental weight fractions (Wj) requires knowledge of the relative elemental sensitivities (Sj) and an environmentally dependent transformation factor (F). The transformation equation may be given by the expression:

$$W_j = F y_j / S_j \qquad (1)$$

When gamma rays from both thermal neutron capture and fast neutron inelastic reactions are detected, the same general transformation equation applies, however the transformation factor (F) and the elemental sensitivities (Si) will be different for the two reactions. Equation (2) below is for capture gamma ray (c) reactions:

$$Wc,j=FcYc,j/Sc,j \qquad (2)$$

and equation (3) below is for inelastic gamma ray (i) reactions:

$$Wi,j=FiYi,j/Si,j \qquad (3)$$

The elemental sensitivities for both capture and inelastic reactions may be measured in the laboratory using rock formations carefully constructed to include a known mix of elements. The environmental transformation factor, however, is more difficult to define by laboratory experiment because of the large number of different conditions that may exist in any wellbore diameter, instrument position within the wellbore, presence or absence of casing, type of cement in cased wellbores and the composition of the fluid 16). Therefore, the transformation factor (F) must be determined depth-by-depth from the actual measurements made by the well logging instrument 10 in the wellbore 14. For capture reactions the transformation factor has been successfully determined using a closure argument with assumed association factors (Xj) for unmeasured elements. The capture transformation factor (Fe) which satisfies closure may be calculated according to the following expression $$Fc=1/\{(\Sigma j\ Xj(Yc,j/Sc,j)\} \qquad (4)$$

The elements typically quantified robustly using capture gamma ray reaction spectral analysis include Si, Ca, Fe, S, Ti, K, Al, Na, and Mg. The foregoing set of elements, together with their oxide and carbonate associations, represents a fraction of the total rock weight that is large enough for reliable closure normalization. Closure normalization, however, cannot be used to determine the inelastic transformation factor (Fi) because typically not enough different rock elements can be robustly quantified using inelastic reaction gamma ray spectral analysis.

In an example of the present invention it may be possible to determine the inelastic transformation factor (Fi) by setting the weight concentrations for elements detected by both capture gamma ray spectral analysis and inelastic gamma ray spectral analysis to be the same within statistical uncertainties. i.e., Wc=Wi for such elements. An example implementation of such a procedure may include minimizing the difference between the elemental concentrations determined from both inelastic gamma ray spectral analysis and capture gamma ray spectral analysis, weighted by their expected statistical uncertainties (e.g., standard deviation σ). An example of such procedure includes minimizing the following expression with respect to changes in Fi:

$$\Sigma j\{(FiYi,j/Si,j-Wc,j)^2/((Fi\sigma Yi,j/Si,j)^2+(\sigma Wc,j)^2)\} \qquad (5)$$

Any or all of the elements quantifiable by both capture and inelastic spectral analysis can be included in the optimization set forth in equation (5).

An important element quantified with inelastic gamma ray spectral analysis is carbon (C) since it typically cannot be quantified using capture gamma ray spectral analysis; however, the estimated concentrations of the elements common to both methods can be enhanced by combining the two separate estimations, either by choosing the more reliable of the two or by calculating a weighted average. The enhanced weight fractions may be referred to as Wic since they are derived from both inelastic and capture information. If the foregoing enhanced estimation modifies some but not all of the elemental concentrations determined from capture closure, the elemental concentrations not modified may be readjusted such that the capture closure relation is satisfied once again. An enhanced capture transformation factor, Fic, is computed by solving equation (6) where m represents the subset of elements measured by capture and inelastic that we have chosen to enhance and n is the subset of elements included in capture closure excluding those in the subset m.

$$Fic\{\Sigma nXn(Yc,n/Sc,n)\}+\Sigma mXmWic,m=1 \qquad (6)$$

Enhanced weight fractions for the elements in capture subset n are then computed from equation (7).

$$Wic,n=FicYc,n/Sn,n \qquad (7)$$

Furthermore, because the elemental concentrations from capture gamma ray spectral analysis are used in equation (5), to determine the inelastic transformation factor (Fi), one will obtain a different factor using the modified concentrations. To account for such variation in the inelastic, transformation factor (Fi) an iterative procedure may be applied for best results.

It will be appreciated by those skilled in the art that when using, for example a Pulsed Neutron Generator (PNG) as a neutron source, inelastic gamma rays are present only while the generator is producing neutrons and such inelastic gamma rays are best separated from capture gamma rays by pulsing the neutron source on for times in the range of 10 to 30 microseconds, typically every 50 to 100 microseconds, resulting in an inelastic gate of 10 to 30 microseconds while the neutrons are being generated and a capture gate of typically 40 to 70 microseconds while the neutron source is off. Capture gamma rays, or more precisely gamma rays emitted promptly following thermal neutron capture, are present for typically several hundred microseconds after the 10 to 30 microsecond pulse of neutrons ends, thus capture gamma rays are cleanly separated from inelastic gamma rays with the pulsing sequence described above. Although there will be no inelastic events during the capture gate the inelastic gate will include a background of capture events, typically 10 to 30 percent of the total. This capture background can be estimated and removed by accumulating events from a suitable portion of the capture gate and subtracting these events from the inelastic gate. The resulting energy spectra of inelastic and capture gamma rays can then be spectrally analyzed to estimate the inelastic and capture elemental contributions.

Figure 2:
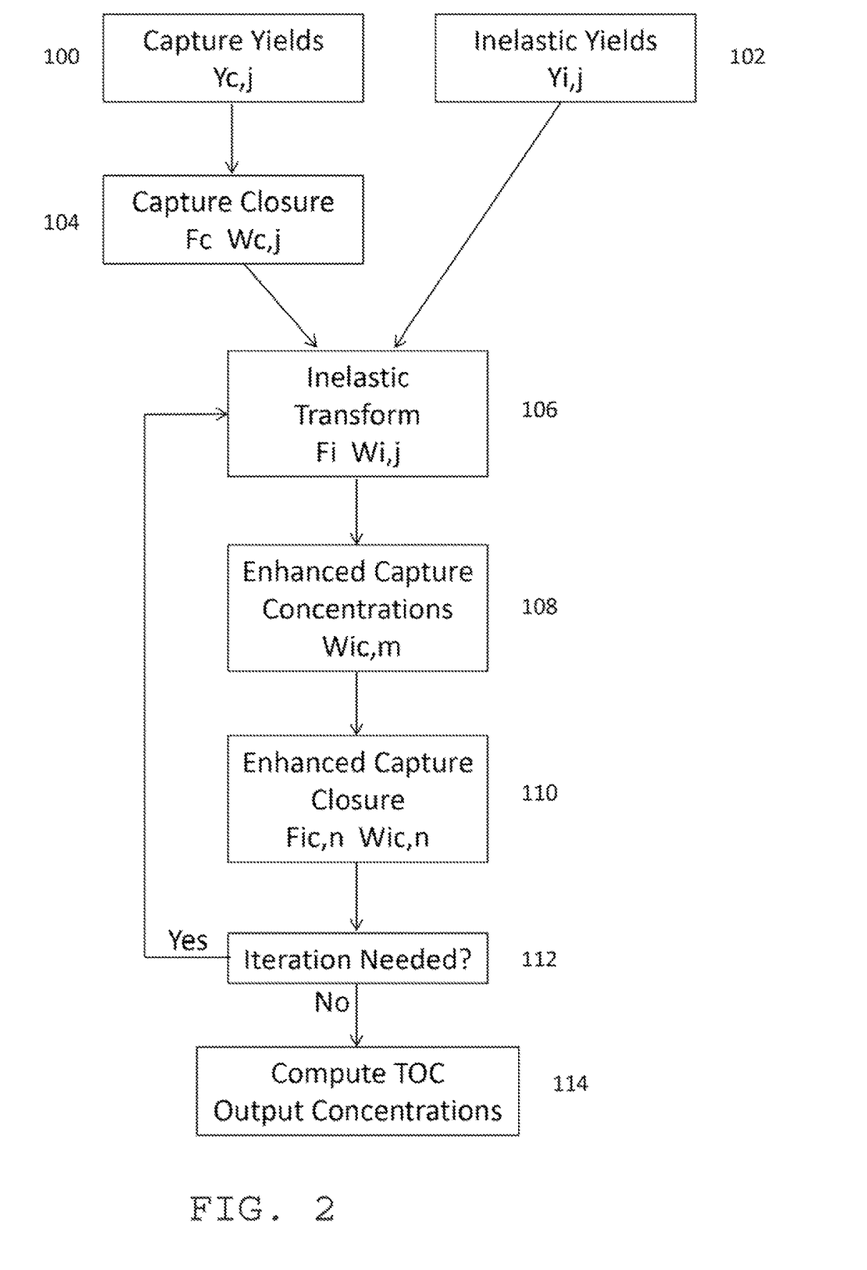
FIG. 2 is a flow chart of an example data procedure.

An example implementation of a method is shown in a flow chart in FIG. 2. At 100 and 102, respectively, elemental yields may be determined from capture gamma ray spectral analysis and inelastic gamma ray spectral analysis. At 104, the capture gamma ray yields may be converted to weight fractions Wc by using, equation (4) to determine the capture gamma ray transformation factor Fc and then equation (2) to perform the conversion from yields to weight fractions. At 106, weight fractions for elements quantified by inelastic gamma ray spectral analysis (Wi, j) are set equal) within statistical uncertainties, to weight fractions for elements quantified by capture gamma ray spectral analysis (Wc, j) by minimizing the expression in equation (5) thus enabling determination of the inelastic environmental transformation factors (Fi, k) for each depth (k) in the wellbore (14 in FIG. 1). At 108 enhanced capture gamma ray-determined weight fractions may be determined for those elements quantifiable by both capture gamma ray spectral analysis and inelastic gamma ray spectral analysis, either by choosing the more reliable of the two determined weight fractions for each element or by forming a weighted average of the two determined weight fractions. At 110, capture gamma ray weight fraction closure is reevaluated using equation (6) with input from the enhanced weight-fraction concentrations for elements quantifiable by both capture gamma rays and inelastic gamma rays to produce enhanced weight-fraction concentrations for all the elements quantified using capture gamma rays. If the enhanced capture gamma ray quantification closure significantly changes any of the elemental weight-fraction concentrations used for the inelastic gamma ray optimization, at 112, the process may be resumed at 106 using the enhanced capture gamma ray weight fractions (Wic) to determine the inelastic transformation factor and repeated until the closure changes become insignificant or fall below a selected threshold. The process may end at such time as shown at 114 wherein elemental weight fractions for all elements are determined.

Figure 3:
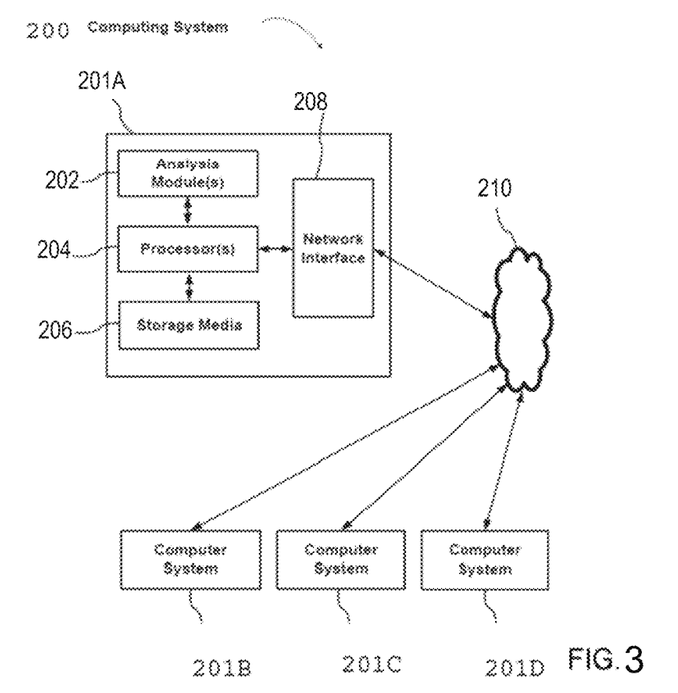
FIG. 3 shows an example computer system that may be used to perform an example data processing procedure.

FIG. 3 depicts an example computing system 200 in accordance with some embodiments. The computing system 200 may be an individual computer system 201A or an arrangement of distributed computer systems. The computer system 201A may include one or more analysis modules 202 that are configured to perform various tasks according to some embodiments, such as the tasks depicted in FIG. 2. To perform these various tasks, analysis module 202 may execute independently, or in coordination with, one or more processors 204, which may be connected to one or more storage media 206. The processor(s) 204 may also be connected to a network interface 208 to allow the computer system 201A to communicate over a data network 210 with one or more additional computer systems, such as shown at 201B, 201C, and/or 201D. It should be clearly understood that computer systems 201B, 201C and/or 201D may or may not share the same architecture as computer system 201A, and may be located in different physical locations, e.g. computer systems 201A and 201B may be on a ship underway on the ocean or any other location, while in communication with one or more computer systems such as 201C and/or 201D that are located in one or more data processing centers on shore, other ships, and/or located in varying countries on different continents.

A processor can include a microprocessor, microcontroller, processor module or subsystem, programmable integrated circuit, programmable gate array, or another control or computing device.

The storage media 206 can be implemented as one or more computer-readable or machine-readable storage media. Note that while in the example embodiment shown in FIG. 3 the storage media 206 is depicted as within computer system 201A, in some embodiments, storage media 206 may be distributed within and/or across multiple intermit and/or external enclosures of computing system 201A and/or additional computing systems. Storage media 206 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions described above may be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 200 is only one example of a computing system, and that computing system 200 may have more or fewer components than shown, may combine additional components not depicted in the exemplary embodiment of FIG. 3, and/or computing s stem 200 may have a different configuration or arrangement of the components depicted in FIG. 3. The various components shown in FIG. 3 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining weight fractions of a plurality of elements in a subsurface formation penetrated by a wellbore, comprising:

in a computer, determining weight fractions of individual elements in a first plurality of elements using measurements of capture gamma rays made in the wellbore, the capture gamma rays resulting from bombardment of the formations with neutrons, and a capture transformation factor Fc;

in the computer, determining weight fractions of individual elements in a second plurality of elements using measurements of inelastic gamma rays made in the wellbore, the inelastic gamma rays resulting from bombardment of the formations with neutrons, and an inelastic transformation factor Fi;

in the computer, optimizing the inelastic transformation factor Fi by minimizing weighted average difference between inelastic and capture weight fractions for elements present in both the first plurality of elements and the second plurality of elements;

in the computer, determining weight fractions of individual elements that are present in the second plurality but that are not present in the first plurality of elements using the optimized inelastic transformation factor.

2. The method of claim 1 wherein the determining weight fractions of individual elements in the first plurality of elements comprises minimization of a closure function.

3. The method of claim 1 wherein the bombardment of the formation comprises emitting controlled duration bursts of neutrons from a pulsed neutron generator.

4. The method of claim 1 wherein the detecting gamma rays comprises activation thereby of a scintillation detector.

5. The method of claim 1 wherein the optimization of the inelastic transformation factor Fi is performed according to equation:

$$\Sigma j\{(Fi Y_{i,j}/S_{i,j} - W_{c,j})^2/((Fi\sigma Y_{i,j}/S_{i,j})^2 + (\sigma W_{c,j})^2)\}$$

wherein j designates an individual element, Y designates gamma-ray yield, W designates weight fraction, S designates elemental sensitivity, σ designates standard deviation, i designates inelastic gamma rays, and c designates capture gamma rays.

6. The method of claim 1 further comprising, in the computer, determining an enhanced transformation factor Fic by taking into account of measurements of both inelastic gamma rays and capture gamma rays.

7. The method of claim 2 wherein determining weight fractions of individual elements in the first plurality of elements comprises determining enhanced weight fractions thereof and recalculating a transformation factor for the first plurality of elements until differences between the determined weight fractions of the first plurality of elements and the enhanced weight fractions is at least one of minimized and fall below a selected threshold.

8. The method of claim 3 wherein the inelastic gamma rays are detected in a first selected length time interval occurring during and/or after at least one of the neutron bursts.

9. The method of claim 3 wherein the capture gamma rays are detected in a second selected length time interval after an end of at least one of the neutron bursts.

10. The method of claim 4 wherein the determining weight fractions of individual elements comprises analyzing numbers of gamma rays having particular energy levels by measuring an amplitude of light flashes emanating from the scintillation detector upon detection gamma rays.

11. The method of claim 6, wherein Fic is determined by solving equation:

$$Fic\{(\Sigma n X_n(Y_{c,n}/S_{c,n})\} + \Sigma m X_m W_{ic,m} = 1$$

wherein m designates a subset of individual elements measured by both inelastic gamma rays and capture gamma rays, n designates another subset of individual elements measured by capture gamma rays but are excluded in subset m, Y designates gamma-ray yield, W designates weight fraction, S designates elemental sensitivity, i designates inelastic gamma rays, and c designates capture gamma rays.

12. The method of claim 11 further comprising, in the computer, determining an enhanced weight fraction Wic by solving equation:

$$W_{ic,n} = Fic Y_{c,n}/S_{c,n}.$$

13. A method for well logging comprising:
moving a well logging instrument along a wellbore drilled through subsurface formations, the well logging instrument including a source of neutrons and at least one gamma ray detector, the gamma ray detector coupled to a spectral analyzer;
in a computer, determining weight fractions of individual elements in a first plurality of elements using measurements of capture gamma rays made in the wellbore, the capture gamma rays resulting from bombardment of the formations with neutrons, and a capture transformation factor Fc;
in the computer, determining weight fractions of individual elements in a second plurality of elements using measurements of inelastic gamma rays made in the wellbore, the inelastic gamma rays resulting from bombardment of the formations with neutrons, and an inelastic transformation factor Fi;
in the computer, optimizing the inelastic transformation factor Fi by minimizing weighted average difference between inelastic and capture weight fractions for elements present in both the first plurality of elements and the second plurality of elements;
in the computer, determining weight fractions of individual elements that are present in the second plurality but that are not present in the first plurality of elements using the optimized inelastic transformation factor.

14. The method of claim 13 wherein the determining weight fractions of individual elements in the first plurality of elements comprises minimization of a closure function.

15. The method of claim 13 wherein the moving the well logging instrument along the wellbore drilled through subsurface formations comprises extending and/or retracting an electrical cable having the well logging instrument coupled to an end thereof.

16. The method of claim 13 wherein the moving a well logging instrument along a wellbore drilled through subsurface formations comprises moving a drill string having the well logging instrument forming a part thereof along the wellbore.

17. The method of claim 13 wherein the bombardment of the formation comprises emitting controlled duration bursts of neutrons from a pulsed neutron generator.

18. The method of claim 13 wherein the detecting gamma rays comprises activation thereby of a scintillation detector.

19. The method of claim 14 wherein determining weight fractions of individual elements in the first plurality of elements comprises determining enhanced weight fractions thereof and recalculating a transformation factor for the first plurality of elements until differences between the determined weight fractions of the first plurality of elements and the enhanced weight fractions is at least one of minimized and fall below a selected threshold.

20. The method of claim 17 wherein the inelastic gamma rays are detected in a first selected length time interval occurring during and/or after at least one of the neutron bursts.

21. The method of claim 17 wherein the capture gamma rays are detected in a second selected length time interval occurring after an end of at least one of the neutron bursts.

22. The method of claim 18 wherein the determining weight fractions of elements comprises analyzing numbers of gamma rays having particular energy levels by measuring an amplitude of light flashes emanating from the scintillation detector upon detection gamma rays.

* * * * *